(12) United States Patent
Fujibayashi

(10) Patent No.: US 7,587,457 B2
(45) Date of Patent: Sep. 8, 2009

(54) MESSAGE AUTOMATIC NOTIFICATION SYSTEM, MESSAGE AUTOMATIC NOTIFICATION METHOD, COMMUNICATION TERMINAL DEVICE, AND RECORDING MEDIUM

(75) Inventor: Toshihiko Fujibayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 748 days.

(21) Appl. No.: 11/226,316

(22) Filed: Sep. 15, 2005

(65) Prior Publication Data
US 2006/0079210 A1    Apr. 13, 2006

(30) Foreign Application Priority Data
Sep. 27, 2004    (JP)    ............... 2004-280087

(51) Int. Cl.
*G06F 15/16*    (2006.01)
(52) U.S. Cl. .............. 709/206; 709/204; 709/205; 709/224; 455/550.1; 455/412.1; 455/435.1; 455/403; 455/466
(58) Field of Classification Search .......... 709/204–206
See application file for complete search history.

(56) References Cited
U.S. PATENT DOCUMENTS
6,580,981 B1 * 6/2003 Masood et al. ............... 701/29

2002/0055975 A1 * 5/2002 Petrovykh .................. 709/205
2005/0187781 A1 * 8/2005 Christensen ................. 705/1

FOREIGN PATENT DOCUMENTS
JP    2002-315053 A    10/2002
JP    2003-316707 A    11/2003

* cited by examiner

*Primary Examiner*—Jude J Jean Gilles
(74) *Attorney, Agent, or Firm*—Foley & Lardner LLP

(57) ABSTRACT

A message automatic notification system sends a message via a communication network to at least another communication terminal devices registered in a communication terminal device. The communication terminal device includes a control circuit, a communication circuit, and a memory unit. The control circuit causes a message-sending condition to be registered in the memory unit, obtains presence information from the other communication terminal device registered in the memory unit via the communication network, judges whether the message-sending condition where a message is sent when the presence information turns to be a predetermined state is established based on the presence information obtained, and sends a message previously registered by a user in the memory unit when judged that the message-sending condition is established.

35 Claims, 5 Drawing Sheets

MESSAGE AUTOMATIC NOTIFICATION SYSTEM, MESSAGE AUTOMATIC NOTIFICATION METHOD, COMMUNICATION TERMINAL DEVICE, AND RECORDING MEDIUM

BACKGROUND OF THE INVENTION

1. Field of the Invention

The present invention relates to a message automatic notification system, a message automatic notification method, a communication terminal device, and a recording medium. The invention particularly relates to a message automatic notification system, a message automatic notification method, a communication terminal device, and a recording medium, which use presence information for automatically notifying available conference participants of a message as to the holding of a conference or the like.

2. Description of the Related Art

In order to hold an urgent conference or to have a meeting in a limited time with related parties, an operator needs to contact conference participants in regard to, for example, participation requests.

When making participation requests by telephone, the operator needs to call each person one by one, which is bothersome. Further, the operator cannot contact a party on the other end when the party is absent. Also, when making participation requests by e-mail, there may be cases where the other party is out of office, where the other party is in a conference, and where the other party is busy with many other obligations, and therefore the other party cannot read the e-mail, so the operator may not obtain a reply from the other party.

Each of those cases is caused by the fact that the contacting side cannot know the circumstances of the other party which is to be contacted.

As one of recent information services, JP 2003-316707 A (mentioned as Document 1 below), for example, discloses a presence information service for notifying a communication status (or presence state) of a user to the other user on the other end of the communication terminal (e.g., online, offline, or out-of-office).

Document 1 describes a presence control method, used in a use terminal on which a communication system such as an IM (instant messenger) is mounted, for notifying a communication status of a user to the other user. The use terminal has means for setting a communication status of a user to be notified for each other party registered in the terminal or for each group of other parties to which the other party belongs. Then, the use terminal registers, in a server, information on a communication status to be notified for each set other party. When other users inquire about the user's status, the server identifies a user inquiring and notifies of the user's status set for each other party. Thus, the server can change the user's status to be notified (e.g., online, offline, or out-of-office) for each other party or for each other party group.

On the other hand, when contacts in regard to conference participation requests etc. are made, there assumed a case where a message is conveyed by telephone or e-mail at an appropriate time by considering the other party's status or the like. In this case, the message sender needs to monitor the presence information of the other party and to perform sending operation when a status turns to be appropriate for sending a message. However, the sender has to wait until the status of the other party turns to be appropriate, which may be inconvenient for the sender. Therefore, there may be cases where it is difficult for the message sender to perform the sending operation or where the sender may forget to send a message at an appropriate time.

To eliminate such inconveniences, JP 2002-315053 A (mentioned as Document 2 below), for example, discloses a mobile communication system capable of message transfer, call request, and call reception according to the other party's conveniences in terms of time and place.

Document 2 describes automatic sending of messages accumulated in a message center to subscribers. A base-controlling station stores: a message transfer status specified by a mobile communication terminal (date and time, place, etc.) and a message type; or a communication start status, communication other party information, and communication type. When an access is made from the mobile communication terminal, the base-controlling station searches for the message transfer status corresponding to the mobile communication terminal. When it is find out that the message transfer status is stored, the base-controlling station controls the base to perform communication corresponding to the message transfer status (such as mail transfer, automatic call to a specific destination, etc.). That is, the base-controlling station automatically sets the base to perform communication. Therefore, the mobile communication system described in Document 2 can control message transfer, call request, and call reception according to subscriber's conveniences in terms of time and place.

However, when the organizer intends to hold an urgent conference or to have a meeting in a limited time among related parties, the organizer may not need all ten members to participate. For example, only five of the members may be enough for the organizer to hold a conference. At that time, it would be convenient if the message sender intending to hold a conference can grasp current situations of conference participants and simultaneously automatically send a message as to the holding of a conference to the minimum number of available members.

The technologies disclosed in Documents 1 and 2 cannot always appropriately cope with demands for automatically sending the message as to the holding of a conference to the minimum number of available members. That is, the presence information service described in Document 1 can grasp current situations of conference participants but cannot search for available members to satisfy the minimum number. Also, the mobile communication system described in Document 2 can transfer a message according to other party's conveniences in terms of time and place but does not consider whether the possible participants can participate the conference. Also, the mobile communication system described in Document 2 is not a system that sends a message as to the holding of a conference only to available conference participants.

SUMMARY OF THE INVENTION

In view of the above-mentioned problems, an exemplary feature of the present invention is to provide a message automatic notification system, a message automatic notification method, a communication terminal device, and a recording medium, which use presence information for automatically notifying available conference participants of a message as to the holding a conference or the like.

To achieve the above-mentioned exemplary feature, a first message automatic notification system according to the present invention sends a message via a communication network to at least one of the other communication terminal devices registered in a communication terminal device. The communication terminal device includes: a sending-condition registering circuit for registering a message-sending condition; a presence information obtaining circuit for obtaining presence information from the other communication terminal device registered in its own communication terminal device via the communication network; judging circuit for judging whether the sending-condition where the presence information turns to be a predetermined state is established based on the obtained presence information; and a message sending circuit for sending a message previously registered in its own communication terminal device when judged that the sending-condition is established.

In the first message automatic notification system according to the present invention, the presence information obtaining circuit may further obtain the presence information from the registered other communication terminal device only for a period previously registered in its own communication terminal device.

In the first message automatic notification system according to the present invention, the message sending circuit may further send the message only to a communication terminal device that provides presence information in which the sending-condition is established.

In the first message automatic notification system according to the present invention, the message sending circuit may further send the message by e-mail.

In the first message automatic notification system according to the present invention, the message sending circuit may further send the message by an instant message.

In the first message automatic notification system according to the present invention, the presence information obtaining circuit may further obtain the presence information from the other communication terminal device registered in the communication terminal device through a presence server connected to the communication network.

Also, to achieve the above-mentioned exemplary feature, a second message automatic notification system according to the present invention sends a message via a communication network to at least one of the other communication terminal devices registered in a communication terminal device. The communication terminal device includes a control circuit, a communication circuit, and a memory unit. The control circuit registers a message-sending condition in the memory unit, obtains presence information from the other communication terminal device registered in the memory unit via the communication network, judges whether the sending-condition where the presence information turns to be a predetermined state is established based on the obtained presence information, and sends via the communication circuit a message previously registered by a user in the memory unit when judged that the sending-condition is established.

In the second message automatic notification system according to the present invention, the control circuit may further obtain the presence information from the other communication terminal device registered in the memory unit only for a period previously registered in the memory unit.

In the second message automatic notification system according to the present invention, the control circuit may further send the message via the communication circuit only to a communication terminal device that provides presence information in which the sending-condition is established when judged that the sending-condition is established.

In the second message automatic notification system according to the present invention, the control circuit may further send the message by e-mail via the communication circuit when judged that the sending-condition is established.

In the second message automatic notification system according to the present invention, the control circuit may further send the message by an instant message via the communication circuit when judged that the sending-condition is established.

In the second message automatic notification system according to the present invention, the control circuit may further obtain the presence information from the registered other communication terminal device through a presence server connected to the communication network via the communication circuit.

Also, to achieve the above-mentioned exemplary feature, in a message automatic notification method according to the present invention, a message is sent via a communication network to at least one of the other communication terminal devices registered in a communication terminal device. The method includes: registering a message-sending condition in the communication terminal device; obtaining presence information from the other communication terminal device registered in the communication terminal device via the communication network; judging whether the sending-condition where the presence information turns to be a predetermined state is established based on the obtained presence information; and sending a message previously registered when judged that the sending-condition is established.

In the message automatic notification method according to the present invention, further, the presence information may be obtained from the registered other communication terminal device only for a period previously registered.

In the message automatic notification method according to the present invention, further, the message may be sent only to a communication terminal device that provides presence information in which the sending-condition is established.

In the message automatic notification method according to the present invention, further, the message may be sent by e-mail.

In the message automatic notification method according to the present invention, further, the message may be sent by an instant message.

Also, to achieve the above-mentioned exemplary feature, a first communication terminal device according to the present invention sends a message via a communication network to at least one of the other communication terminal devices registered. The first communication terminal device includes: a sending-condition registering circuit for registering a message-sending condition; presence information obtaining circuit for obtaining presence information from the other communication terminal device registered via the communication network; a judging circuit for judging whether the sending-condition where the presence information turns to be a predetermined state is established based on the obtained presence information; and a message sending circuit for sending a message previously registered when judged that the sending-condition is established.

In the first communication terminal device according to the present invention, the presence information obtaining circuit may further obtain the presence information from the other communication terminal device registered only for a period previously registered.

In the first communication terminal device according to the present invention, the message sending circuit may further send the message only to a communication terminal device that provides presence information in which the sending-condition is established.

In the first communication terminal device according to the present invention, the message sending circuit may further send the message by e-mail.

In the first communication terminal device according to the present invention, the message sending circuit may further send the message by an instant message.

To achieve the above-mentioned exemplary feature, a second communication terminal device according to the present invention sends a message via a communication network to at least one of the other communication terminal devices registered. The second communication terminal device includes a control circuit, a communication circuit, and a memory unit. The control circuit registers a message-sending condition in the memory unit, obtains presence information from the other communication terminal device registered in the memory unit via the communication network, judges whether the sending-condition where the presence information turns to be a predetermined state is established based on the obtained presence information, and sends via the communication circuit a message previously registered by a user in the memory unit when judged that the sending-condition is established.

In the second communication terminal device according to the present invention, the control circuit may further obtain the presence information from the other communication terminal device registered in the memory unit only for a period previously registered in the memory unit.

In the second communication terminal device according to the present invention, the control circuit may further send the message only to a communication terminal device that provides presence information in which the sending-condition is established when judged that the sending-condition is established.

In the second communication terminal device according to the present invention, the control circuit may further send the message by e-mail via the communication circuit when judged that the sending-condition is established.

In the second communication terminal device according to the present invention, the control circuit may further send the message by an instant message via the communication circuit when judged that the sending-condition is established.

In the second communication terminal device according to the present invention, the control circuit may further obtain the presence information from the other communication terminal device registered through a presence server connected to the communication network via the communication circuit.

Also, to achieve the above-mentioned exemplary feature, according to the present invention, a recording medium stores a program which includes a processing for causing a computer of a communication terminal device to send a message via a communication network to at least one of the other communication terminal devices registered. The recording medium storing a program that includes a processing for causing a computer to register a message-sending condition in the computer, to obtain presence information from the other communication terminal device registered in the computer via the communication network, to judge whether the sending-condition where the presence information turns to be a predetermined state is established based on the obtained presence information, and to send a message previously registered when judged that the sending-condition is established.

In the recording medium, the presence according to the present invention, further, program may further includes a processing for causing the computer to obtain the presence information from the other communication terminal device registered only for a period previously registered when obtaining the presence information.

In the recording medium according to the present invention, further, the program may further include a processing for causing the computer to send the message only to a communication terminal device that provides presence information in which the sending-condition is established.

In the recording medium according to the present invention, further, the program may further include a processing for causing the computer to send the message by e-mail.

In the recording medium according to the present invention, further, the program may further include a processing for causing the computer to send the message by an instant message.

Therefore, according to the message automatic notification system, the message automatic notification method, the communication terminal device, and the recording medium of the present invention, when an organizer wants to hold a conference or the like, a message to be notified and a sending-condition (the number of available participants as the sending-condition, for example) can be registered. Moreover, according to the message automatic notification system, the message automatic notification method, the communication terminal device, and the recording medium of the present invention, the communication terminal device collects presence information and confirms that the sending condition has been established from the state of the collected presence information (the number of on-line persons reaches the number of the available participants, for example). Thus, the organizer does not need to confirm the message-sending condition, which is the situation for holding the conference, and the labor for confirming the sending-condition (for instance, the labor for checking each possible participant one by one) can be reduced.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EXEMPLARY EMBODIMENTS

Next, an embodiment of the present invention will be described with reference to the drawings.

According to the embodiment of the present invention, in a communication terminal device having a presence information sending/receiving function and a message sending/receiving function, a message to be notified and a message-sending condition including a presence information have been previously designated. The embodiment of the present invention provides a system for automatically sending a message when a sending-condition is established. In this case, the sending-condition is generated based on the presence information obtained from another party who wants to notify the message. In addition, the presence information indicates the user's communication status or presence status (e.g., online, offline, or out-of office).

Figure 1:
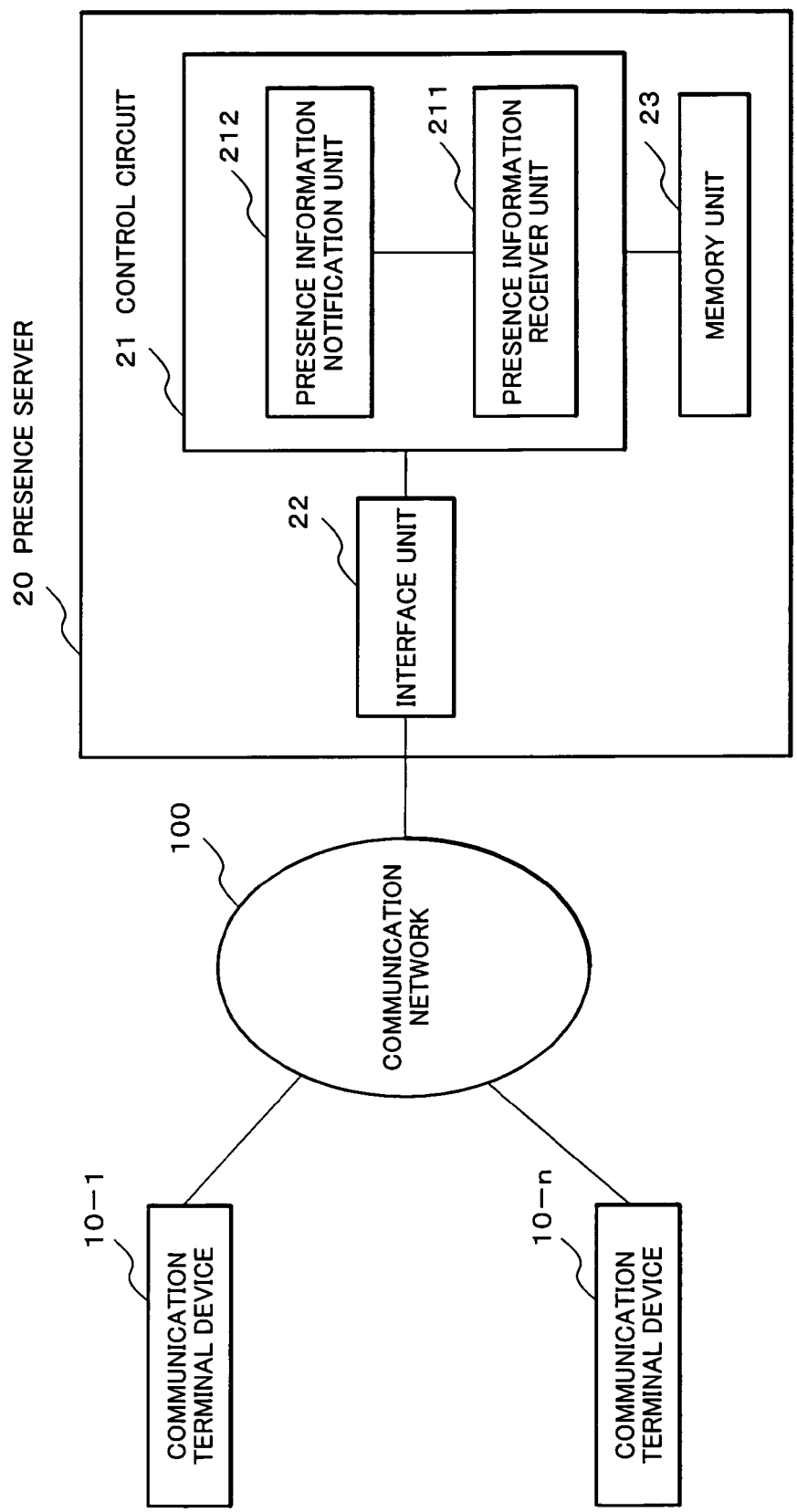
FIG. 1 is a block diagram showing an example of a system construction according to an embodiment of the present invention.

FIG. 1 is a block diagram showing an example of a system construction according to an embodiment of the present invention.

The embodiment shown in FIG. 1 includes: plural communication terminal devices 10 (10-1 to 10-n) as a terminal device having a communication function; a presence server 20 collectively obtains and manages the presence information from the communication terminal devices 10; and a communication network 100. In this case, the communication terminal devices 10 and the presence server 20 are mutually communicably connected via the communication network 100.

The communication terminal devices 10 each are a portable terminal device, which has a communication function, such as a mobile phone, a personal handyphone system (PHS) terminal, a personal digital assistance (PDA), or a game machine. Further, the communication terminal devices 10 each may be a personal computer having a communication function or a portable notebook personal computer having a communication function. That is, the communication terminal devices 10 each are a computer having a communication function used by a user.

The presence server 20 is an information processing device such as a personal computer, a work station, or a server. The presence server 20 includes a control circuit 21, an interface unit 22, and a memory unit 23.

The interface unit 22 communicates with the plural communication terminal devices 10 under control of the control circuit 21.

The memory unit 23 is a non-volatile recording medium device (for example, a magnetic disk device or an optical device). In the memory unit 23, for each group, a table for managing presence information is allocated. Further, in the table, for each contract user, a member name (user name), a presence information state (e.g., online, offline, or out-of-office), a terminal ID, a terminal address (for example, a mail address) are allocated. In this case, Plural pieces of the presence information state may be registered in the memory. Note that for speeding up, the memory unit 23 that allocates the tables may be a memory (for example, random access memory: RAM).

The control circuit 21 operates under program control by a central processing unit (CPU) (not shown). The control circuit 21 includes a presence information receiver unit 211 for storing data received via the interface unit 22 in the memory unit 23. Further, the control circuit 21 includes a presence information notification unit 212 for sending the data stored in the memory unit 23 or edited data to the communication terminal devices 10 via the interface unit 22. The presence information receiver unit 211 and the presence information notification unit 212 operate under program control by the CPU.

The presence information receiver unit 211 receives the presence information (e.g., online, offline, or out-of-office) sent from the communication terminal devices 10 via the interface unit 22 and stores it in the memory unit 23. Terminal IDs (for example, telephone numbers, etc) of the communication terminal devices 10 that sends the presence information are added to the presence information that is received and managed by the presence server 20.

Moreover, when the presence information receiver unit 211 receives a presence information obtaining request from the communication terminal devices 10 via the interface unit 22, a communication path is made between the communication terminal device 10 having the obtaining request and the presence server 20, realizing an online state. Therefore, the presence information receiver unit 211 updates the presence state corresponding to a user having an obtaining request from "offline" to "online" in the table of the memory unit 23. After that, each time the presence information is updated among the members in the group, the presence information notification unit 212 (described later) sends presence information about an updated member to other "online" members in the same group.

Upon sending presence information obtaining request from the communication terminal devices 10 via the interface unit 22, the presence information notification unit 212 notifies the communication terminal devices 10 which are the source of requests, of presence information of all members in the group stored in the memory unit 23 via the interface unit. Further, each time the presence information is updated among the members in the group, the presence information notification unit 212 sends presence information about an updated member to the members having the communication path in the same group via the interface unit 22. In this case, terminal IDs (for example, telephone numbers, etc) of the communication terminal devices 10 are added to the presence information sent from the presence server 20.

The communication network 100 is structured by a mobile communication network, a fixed-line communication network, the Internet containing those networks, or the like (not shown).

Next, referring to FIG. 2 and FIG. 3, the communication terminal devices 10 will be described.

Figure 2:
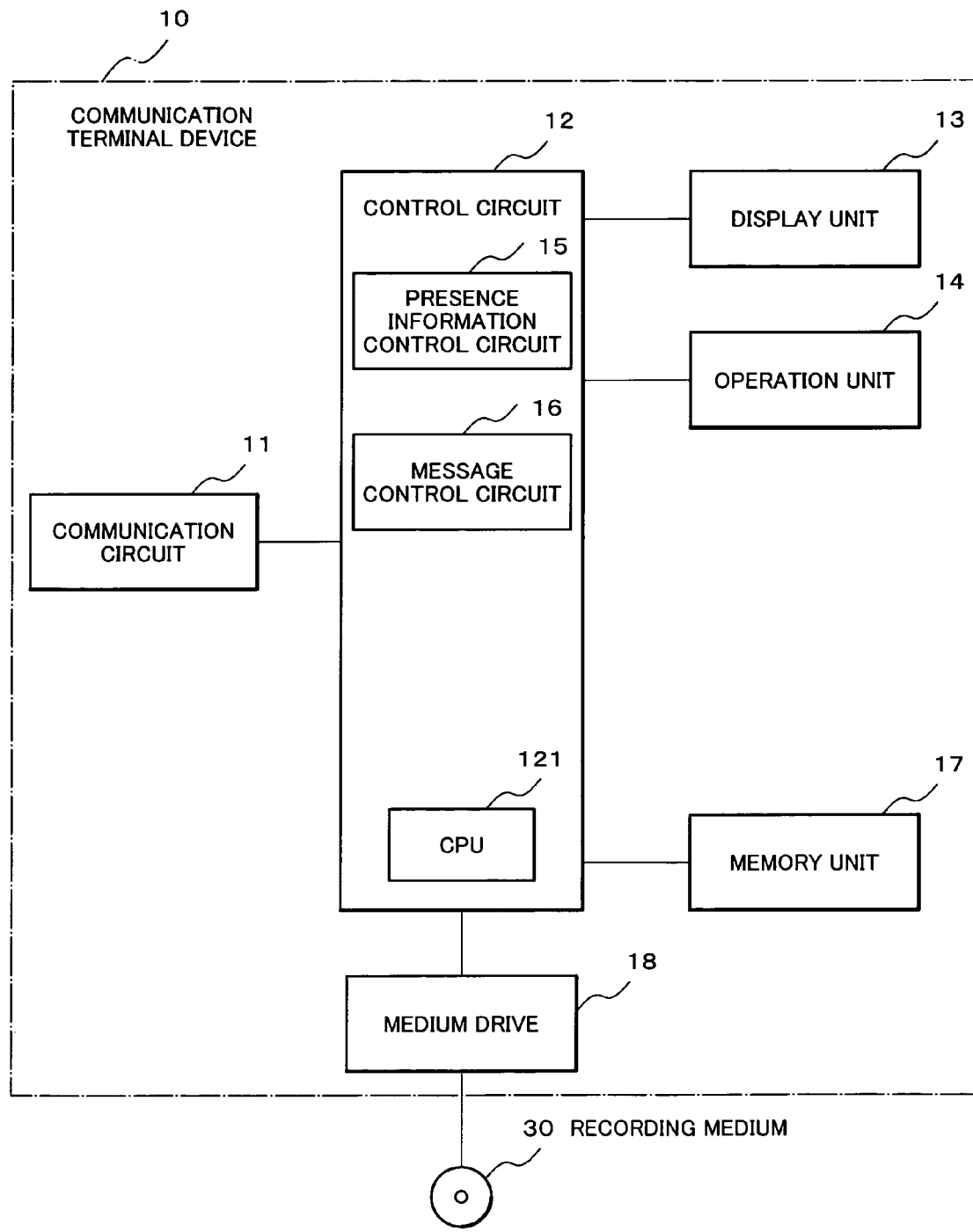
FIG. 2 is a detailed block diagram showing an example of a communication terminal device.

FIG. 2 is a detailed block diagram showing an example of the communication terminal device;

In FIG. 2, the communication terminal device 10 includes a communication circuit 11, a control circuit 12, a display unit 13, an operation unit 14, a memory unit 17, and a medium drive 18.

Further, the communication terminal device 10 includes a sending-condition registering circuit for registering a message-sending condition. In this case, the sending-condition registering circuit is included in the memory unit 17.

Further, the communication terminal device 10 includes a presence information obtaining circuit for obtaining presence information from other communication terminal devices 10 registered in its own communication terminal device (the memory unit 17) for a predetermined period previously registered in its own communication terminal device (the memory unit 17), from the communication network 100. Note that the presence information obtaining circuit obtains presence information from other communication terminal devices 10 registered in its own communication terminal device (the memory unit 17), from the presence server 20 connected to the communication network 100. In this case, the presence information obtaining circuit corresponds to the control circuit 12 and the communication circuit 11.

Further, the communication terminal device 10 includes a judging circuit for judging whether the sending-condition where the presence information turns to be a predetermined state is established based on the obtained presence information from the other communication terminal devices 10. In this case, the judging circuit corresponds to the control circuit 12.

Further, the communication terminal device 10 includes a message sending circuit for sending a message previously registered by a user in its own communication terminal device (the memory unit 17) bye-mail only to the communication terminal device 10 that provides presence information in which the sending-condition is established when it is judged that the sending-condition is established. In this case, the message sending circuit i corresponds to the control circuit 12 and the communication circuit 11.

The control circuit 12 includes a central processing unit (CPU) 121, a presence receiving unit 15, and a presence information notice circuit 16. While the CPU 121 executes a control program stored in the memory unit 17 and various programs including a presence service program, the control circuit 12 controls operational control of its own communication terminal device 10. That is, the control circuit 12 is connected to the communication circuit 11, the control circuit 12, the display unit 13, the operation unit 14, the memory unit 17, and the medium drive 18. And the control circuit 12 controls operational control of its own communication terminal device 10 by using each unit under program control. In the control circuit 12, the presence information control circuit 15 and message control circuit 16 operate under program control while the CPU 121 executes the presence service program.

The presence information control circuit 15 controls to send presence information created and stored in its own communication terminal device 10 via the communication circuit 11 to the presence server 20 and also controls to receive and store presence information about the other communication terminal devices 10 received from the presence server 20 via the communication circuit 11. The presence information control circuit 15 in this case operates under control program by the CPU 121.

The message control circuit 16 controls massage creation and message transmission via the communication circuit 11. The message control circuit 16 in this case operates under program control by the CPU 121.

The communication circuit 11 communicates with the other communication terminal devices 10 and the presence server 20 under control of the control circuit 12 via the communication network 100.

The display unit 13 displays information under control of the control circuit 12. The operation unit 14 allows a user to input information using alphabet, numbers, and symbols by using a keypad under control of the control circuit 12.

The memory unit 17 is a non-volatile recording medium device (not shown) (for example, a magnetic disk device or an optical disc device) or a non-volatile memory (for example, a rewritable memory such as a flash memory). The memory unit 17 stores and holds information necessary to operation/control of its own communication terminal device 10, a control program for its own communication terminal device 10, and the like. Note that the memory unit 17 of a hand-size communication terminal device 10 like a mobile phone, a PHS terminal, a PDA etc, is preferably a non-volatile memory such as a flash memory but is not limited to this.

Note that the presence information control circuit 15 may store presence information of its, own communication terminal device 10 through manual input from the operation unit 14 or the like. In this case, the presence information control circuit 15 may be such a circuit capable of automatically storing presence information created according to an operational state of its own communication terminal device 10 (for example, when its own communication terminal device 10 is connected and communicated with the communication network 100, presence information "online" is created and stored).

The medium drive 18 is, for example, a CD-ROM drive, a CD-rewritable drive, or a DVD burning drive, which can read contents of a recording medium 30. In this case, the medium drive 18 is not necessarily mounted to the communication terminal device 10.

The recording medium 30 of FIG. 2 is, for example, a CD-ROM, a CD-R, a DVD, etc. A presence service program is previously written in the recording medium 30. While the CPU 121 of the control circuit 12 executes the presence service program, the presence information control circuit 15 or the message control circuit 16 then operates based on flowcharts of FIG. 4 and FIG. 5.

A user requiring the presence service needs to install the presence service program previously written in the recording medium 30. That is, when the user sets the recording medium 30 in the medium drive 18 and executes an instruction for installing the presence service program written in the recording medium 30 from the operation unit 14, the control circuit 12 reads the presence service program via the medium drive 18. Then, the control circuit 12 stores the read presence service program in a program storage unit 176 (described later) of the memory unit 17. Note that the user does not necessarily install the presence service program after purchase of the communication terminal device 10. Further, a manufacturer of the communication terminal device 10 may install such program in the program storage unit 176 upon shipment from its factory or a distributor may install such program in the program storage unit 176 upon sale.

Figure 3:
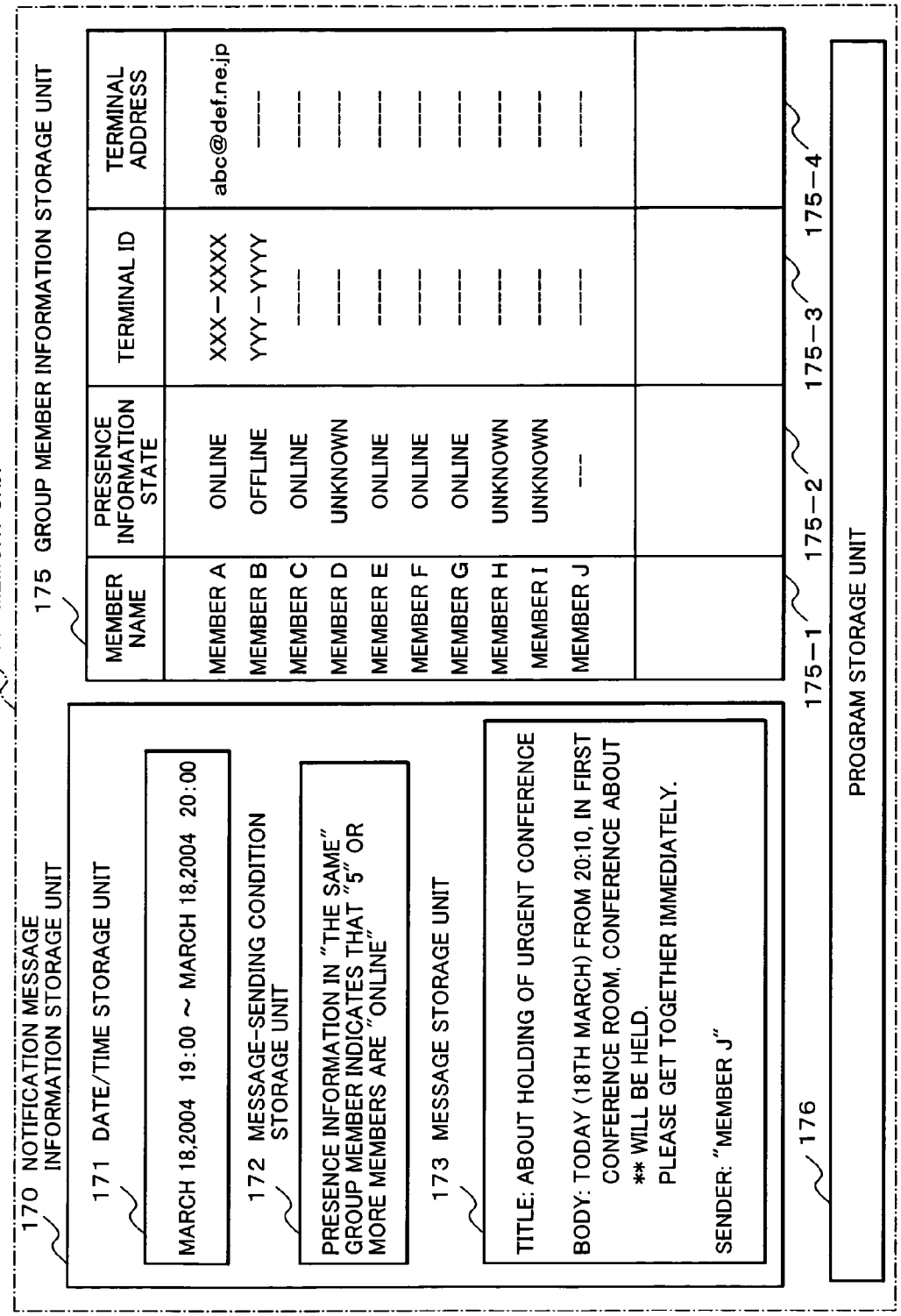
FIG. 3 is a diagram showing an example of information stored in a memory unit of the communication terminal device.

FIG. 3 is a diagram showing an example of information stored in the memory unit 17 of the communication terminal device 10.

In the memory unit 17 of FIG. 3, a notification message information storage unit 170, a group member information storage unit 175, and a program storage unit 176 are allocated. The notification message information storage unit 170 stores at least a message to be notified and a message-sending condition. The group member information storage unit 175 stores presence information from the communication terminal device 10 in another party member to be notified of the message, an terminal ID of the other party member, a terminal address, etc.

The program storage unit 176 stores various programs executed by the CPU 121 of the control circuit 12. Those various programs include various control programs (including Operating System) for basic operation of the communication terminal device 10, a presence service program externally installed, etc.

The notification message information storage unit 170 is further divided into a date/time storage area 171, a message-sending condition storage area 172, and a message storage area 173.

The date/time storage area 171 stores information on a period (start date/time to end date/time) for obtaining presence information of the other party member to whom a message is to be notified. The control circuit 12 of the communication terminal device 10 obtains presence information from the other party member via the presence server 20 only when the presence information is stored in the date/time storage area 171. Further, the control circuit 12 controls so that the message in the message storage area 173 is sent based on the presence information obtained during the period when judged that a sending-condition described later stored in the message-sending condition storage area 172 is established.

The message-sending condition storage area 172 stores the message-sending condition that includes the presence information.

The message storage area 173 includes a title and a body of the message to be notified.

The group member information storage unit 175 stores and holds information on the other party member to whom the message is to be notified (also referred to as group member) in a table format.

The group member information storage unit 175 of FIG. 3 exists for each group. In each group member information storage unit 175, a member name column 175-1, a presence information state column 175-2, a terminal ID column 175-3, and a terminal address column 175-4 are allocated to correspond to each member name. The member name column 175-1 stores information about names of members belonging to the same group. The presence information state column 175-2 includes information indicating presence information (e.g., online, offline, or out-of-office) of the members. The terminal ID column 175-3 includes information indicating telephone numbers etc., of the communication terminal devices 10 possessed by the members. The terminal address column 175-4 stores information indicating destination addresses of messages such as e-mail addresses.

The group member information storage unit 175 exemplified in FIG. 3 stores 10 members (Member A to Member J) belonging to the same group (the member name column 175-1). Current presence information about Member A is "online" (the presence information state column 175-2). A terminal ID of Member A is "XXX-XXXX" (the terminal ID column 175-3) and a terminal address of Member A is "abc@def.ne.jp" (the terminal address column 175-4).

Next, referring to FIG. 4 and FIG. 5, operation of this embodiment will be described.

Figure 4:
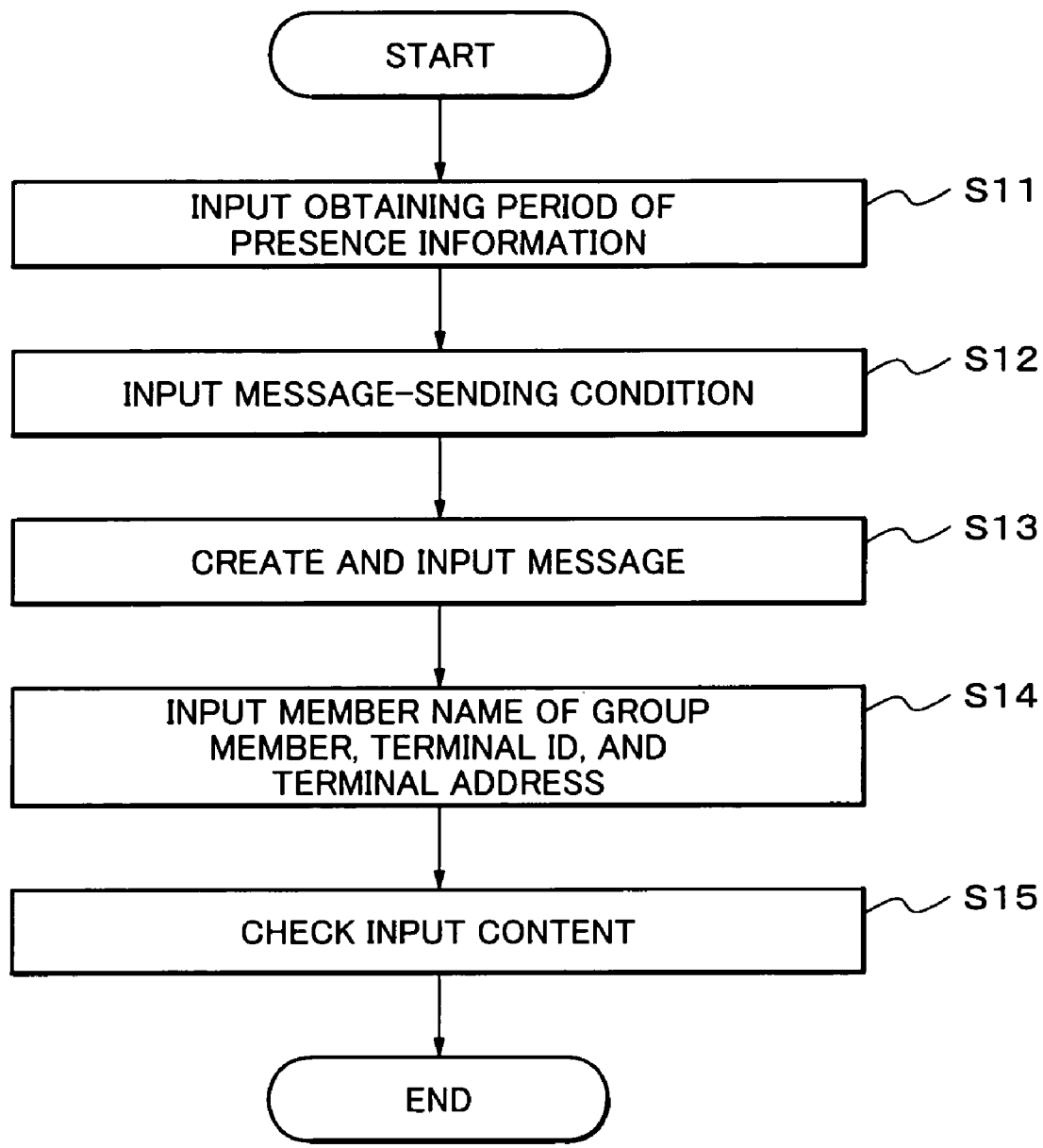
FIG. 4 is a first flow chart explaining operation of the embodiment.

FIG. 4 is a first flow chart for explaining the operation of this embodiment.

The first flow chart shown in FIG. 4 explains preliminary operation in the communication terminal device 10 of this embodiment for setting a message-sending condition for a message to be notified and a message including presence information, and information about the other party member to whom the message is to be notified. Note that the user has contract with a provider that manages the presence server 20 and is registered as a member of a group in the table of the memory unit 23 in the presence server 20. Further, a program for using a presence service is installed in the program storage unit 176 of the memory unit 17 from the recording medium 30 via the medium drive 18.

Referring to FIG. 4, the user of the communication terminal device 10 operates the operation unit 14 etc for activating the presence service program to cause the display unit 13 to display a presence menu screen. When the user selects an item "obtaining period" through the presence menu screen and inputs the obtaining period of the presence information, the presence information control circuit 15 of the control circuit 12 sets and stores the obtaining period of the presence information in the date/time storage area 171 of the memory unit 17 (FIG. 4, Step S11). For example, when the user inputs information indicating "from 19:00 on 18 Mar. 2004 to 20:00 on 18 Mar. 2004" through the operation unit 14, the presence information control circuit 15 of the control circuit 12 sets and stores the input period in the date/time storage area 171 of the memory unit 17 (exemplified in the date/time storage area 171 in FIG. 3). As described later, the communication terminal device 10 operates to receive presence information from the other communication terminal device 10 from the presence server 20 during the input presence information obtaining period.

Next, when a user selects an item "sending-condition" from the presence menu screen and input a message-sending condition from the operation unit 14, the presence information control circuit 15 of the control circuit 12 sets and stores the sending-condition in the message-sending condition storage area 172 of the memory unit 17 (Step S12). The message-sending condition in this case is stored as a sending-condition including presence information. For example, when 'presence information in the same group members indicates that "5" or more members are "online"' is input, the presence information control circuit 15 stores this information in the message-sending condition storage area 172 as described in FIG. 3. As a method of inputting the sending-condition in this case, when the user selects the item "sending-condition", the presence information control circuit 15 displays, for example, "presence information of the same group members indicates "*" members or more are "*"" on the screen of the display unit 13. Plural sentences like this are prepared and the presence information control circuit 15 allows the user to select one of those plural sentences. Further, the presence information control circuit 15 allows the user to set "*" by displaying please click "*" and select the displayed contents'. When the user finishes setting through the operation unit 14, (for example, by pressing down a setting finish button), this information is stored in the message-sending condition storage area 172 of presence information storing unit 15.

After the setting is thus finished, as described below, the presence information control circuit 15 of the communication terminal device 10 receives the presence information from another communication terminal device 10 from the presence server 20 via the communication circuit 11. Thus, the presence information control circuit 15 of the control circuit 12 judges whether the previously-input message-sending condition is established based on the received presence information. As a judging example in this cases, the presence information control circuit 15 searches the group member information storage unit 175 using "offline" and "5 or more members" as keywords, and when the search result indicates 5 or more members are "offline", it is judged that the message-sending condition is established. Therefore, when the sending-condition is thus established, the presence information control circuit 15 of the control circuit 12 controls messages stored in the message storage area 173 to be automatically sent.

Next, when the user operates the operation unit 14 or the like to select from the presence menu screen "message creation", the message control circuit 16 of the control circuit 12 operates to display a message input screen on the display unit 13. Then, the user creates under control of the message control circuit 16 a title and a body of the message to be notified through the message input screen. When the user finishes the creation, the message control circuit 16 sets and stores the title and the body of the created message in the message storage area 173 of the memory unit 17 (Step S13). In this case, the message control circuit 16 allows the user to create a message by letting the user input characters, symbols, etc. from the operation unit 14 via the message input screen displayed in the display unit 13. Further, the message control circuit 16 stores the created message in a separated form into the title and the body for the message of "urgent conference holding" as shown in the message storage area 173 of FIG. 3.

Next, when the user operates the operation unit 14 etc. to select from the presence menu screen an item "other party to be notified", the presence information control circuit 15 of the control circuit 12 operates and displays an input screen of other party to be notified on the display unit 13. The user uses the operation unit 14 to input information about the other party member to whom the message is to be notified on the input screen of other party to be notified. And the presence information control circuit 16 of the control circuit 12 sets and stores the input information about the other party member in the group member information storage unit 175 of the memory unit 17 (Step S14). Here, the information about the other party member input is, for example, as shown in the group member information storage unit 175 of FIG. 3, names of the other party members to whom the message is to be notified (column 175-1), the terminal IDs of the communication terminal devices 10 possessed by members (column 175-3), and terminal addresses the communication terminal devices 10 (column 175-4).

Then, upon finishing the input, the presence information control circuit 15 of the control circuit 12 displays the input information on the display unit 13 to be checked by the user (Step S15), and ends the preliminary operation.

Figure 5:
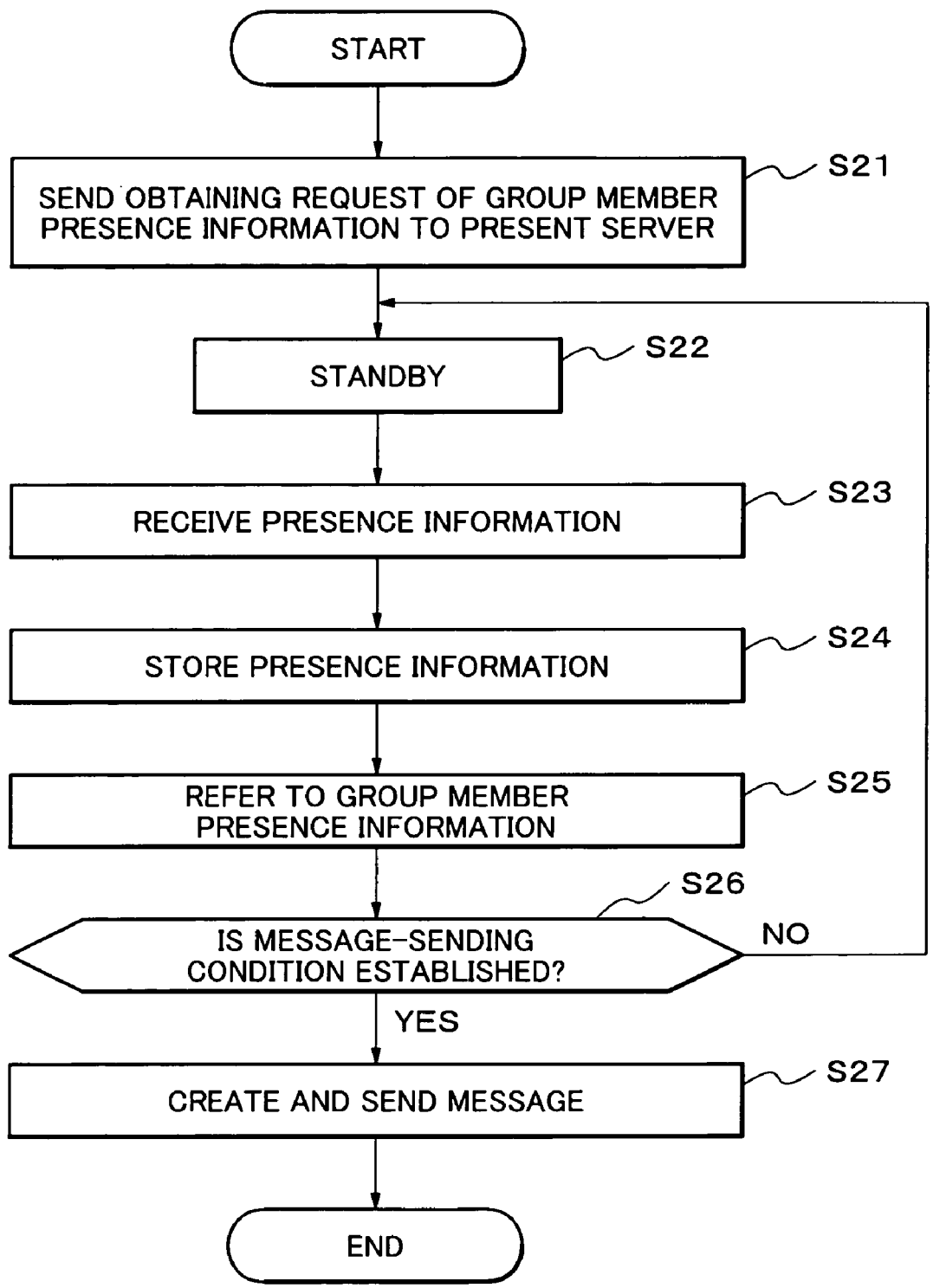
FIG. 5 is a second flow chart explaining the operation of the embodiment.

FIG. 5 is a second flow chart for explaining the operation of the embodiment.

According to the flow chart of FIG. 5, in the communication terminal device 10 according to this embodiment, when other member presence information is obtained during the presence information obtaining period input in Step S11, operation of automatically sending a message to be notified is explained.

Referring to FIG. 5, when the user of the communication terminal device 10 selects an item "service start" from the presence menu screen, the control circuit 12 operates the presence information control circuit 15. Then, the presence information control circuit 15 of the control circuit 12 sends such a request signal (presence obtaining request) that presence information of the other party member to whom a message is to be notified from the presence server 20 via the communication circuit 11 to the presence server 20 (Step S21 in FIG. 5). The presence information control circuit 15 for this request sends terminal IDs of all corresponding members such that presence information storing all members stored in the member name column 175-1 of the group member information storage unit 175 are to be notified. The all members in this case correspond to 10 members (Member A to Member J) among all the members as an example shown in FIG. 3.

The presence information receiver unit 211 of presence server 20 receiving presence obtaining request makes a communication path between the communication terminal device 10 having an obtaining request and its own server. Further, the presence information receiver unit 211 updates the presence state from "offline" to "online" corresponding to the member having the obtaining request among members registered in the table of the memory unit 23. Then, the presence information notification unit 212 sends presence information of the updated member to all "online" members other than the updated member. Further, the presence information notification unit 212 reads, from the memory unit 23, a table which registers presence information of all members corresponding to the member (terminal ID) having an obtaining request, and sends the table only to the communication terminal device 10 having an obtaining request. After that, similarly to other communication terminal devices 10, each time the presence information is updated, the presence information notification unit 212 sends the presence information of the updated member to all the "online" members via the interface unit 21.

When the presence information control circuit 15 of the communication terminal device 10 receives the table which registers presence information of all members via the communication circuit 11 in response to the obtaining request, the presence information control circuit 15 searches whether the member names registered in the group member information storage unit 175 is registered in the received table. In the case, the member names registered in the group member information storage unit 175 of the memory unit 17 are used as a key to search for member names in the received table. Based on the search result, the presence information control circuit 15 extracts the presence information state of all corresponding member names from the received table and writes the state thereof in the presence information state column 175-2 to which the member names correspond, in the group member information storage unit 175.

On the other hand, after receiving the obtaining request from the communication terminal device 10, the presence server 20 collects and receives presence information of all members requested from the communication terminal device 10 possessed by each member. Further, each time the presence server 20 collects updated presence information, the collected presence information is operated to be sent and notified together with the collected terminal ID to the requesting communication terminal device 10. The terminal ID of the communication terminal device 10 that sends the presence information is added to the presence information to be collected and received by the presence server 20, so the member presence information including the terminal ID requested in Step S21 is sent and notified from the presence server 20.

The presence information control circuit 15 of the communication terminal device 10 that has sent the request signal to the presence server 20 in Step S21 still keeps the communication path with the presence server 20 and is thereafter in a standby to wait for updated presence information from the presence server 20 (Step S22).

Then, when the presence information control circuit 15 receives other member presence information via the communication circuit 11 from the presence server 20 (Step S23), the presence information control unit 15 stores the received presence information in the group member information storage unit 175 (Step S24). At this time, the presence information control circuit 15 detects the terminal ID added to the received presence information. A line corresponding to the terminal ID is detected from the terminal ID column 175-3 of the group member information storage unit 175. Further, the presence information control circuit 15 stores the received presence information in the presence information state column 175-2.

For example, the terminal ID added to the received presence information is "XXX-XXXX". Since the terminal ID corresponds to the uppermost line (line of Member A) of the group member information storage unit 175 in FIG. 3, the received presence information is stored in the presence information state column 175-2 which is the uppermost line (line of Member A) of the group member information storage unit 175.

After the presence information received in Step S24 is stored, the presence information control circuit 15 of the communication terminal device 10 refers to presence information of all members of the other party stored in the group member information storage unit 175 (Step S25), and judges whether the message-sending condition stared in the message-sending condition storage area 172 is established.

Operation of Steps S25 and S26 in this case will be described below by way of specific examples.

For example, presence information of all members of the other party has contents stored in the group member information storage unit 175 as shown in FIG. 3. Referring to the presence information of the other members in FIG. 3, 5 members are "online" (Members A, C, E, F, and G), 1 member is "offline" (Member B), and 4 members are other state. Here, the message-sending condition stored in the message-sending condition storage area 172 is "5 or more members are on-line", the presence information control circuit 15 judges that the message-sending condition is established. If presence information of Member C is "offline", 4 members are "online" (Members A, E, F, and G), so the presence information control circuit 15 judges that the message-sending condition is not established.

When it is judged that the message-sending condition is established (YES in Step S26), the presence information control circuit 15 transmits, to all the corresponding members, the message stored in the message storage area 173 of the memory unit 17 via the communication circuit 11 (Step S27). Here, the corresponding member is another party member in which a sending-condition is established, and in the above specific example, contents of the presence information state column 175-2 of the group member information storage unit 175 indicate the "online" members (Members A, C, E, F, and G).

Note that the message stored in the message storage area 173 of the memory unit 17 is sent to the corresponding member in the following manner. That is, the presence information control circuit 15 operates the message control circuit 16 to create a sending message. The message control circuit 16 in this case inserts a title part stored in the message storage area 173 into a sending message title, and inserts a main body part stored in the message storage area 173 into a body of the sending message. Then, the message control circuit 16 inserts a terminal address into an address of the sending message of the corresponding member. Then, the message control circuit 16 sends the generated sending message by e-mail via the communication circuit 11. Note that the terminal address in this case is stored in the terminal address column 175-4 of the group member information storage unit 175.

When the message-sending condition is not established (NO in Step 26), the presence information control circuit 15 is in a standby state while returning to Step S22 to wait for next reception of presence information from the presence server 20. Note that a period for receiving presence information is a period stored in the date/time storage area 171 of the notification message information storage unit 170.

When the presence service is to be ended, the user of the communication terminal device 10 selects an item "service end" from presence menu screen, the presence information control circuit 15 requests cutting of the communication path with the presence server 20. After that, when the presence information receiver unit 211 of presence server 20 receives the cutting request, the communication path between the communication terminal device 10 and its own server is cut based on the cutting request, and the presence information state is set as "offline" in the table corresponding to the member having the cutting request.

The operation of this embodiment has been described above.

Note that in the description of this embodiment, the message transmission/reception function (the message control circuit 16 of the communication terminal device 10 in FIG. 2) is the e-mail transmission/reception function, which may be replaced by an instant message transmission/reception function.

The instant message is as known a message directly transmitted and received among mates using the software called an instant messenger (IM). With the IM, this software user checks whether other mates on the Internet using the same software are, online. When they are online, the mates can chat, do file transfer, etc.

Also, in the above description, the presence service program recorded in the recording medium 30 is read via the medium drive 18 mounted in the communication terminal device 10, but it is not limited thereto. For example, the communication terminal device 10 and an external medium drive may be connected with a USB cable. Then, the control circuit 12 of the communication terminal device 10 may read the presence service program from the recording medium 30 inserted into the external drive to write the program in the program storage unit 176 of the memory unit 17.

Also, for example, the recording medium 30 having the control program written therein is inserted into a slot of the communication terminal device 10 so that the control circuit 12 of the communication terminal device 10 may read the presence service program from the recording medium device 30 to write the program in the program storage unit 176 of the memory unit 17. The recording medium 30 in this case is desirably a card with a non-volatile memory (for example, a flash memory) mounted but is not limited thereto.

Also, for example, the recording medium 30 having the control program written therein may be inserted into the slot of the communication terminal device 10 to be used as a part of the program storage unit 176 of the memory unit 17. The recording medium 30 in this case is desirably a card with a non-volatile memory (for example, a flash memory or a ROM) mounted but is not limited thereto.

As described above, in the embodiment of the present invention, when a conference or the like is held, by registering only a message to be notified and conference possible participants, it is possible to automatically know current states of the conference possible participants as presence information, thus reducing time and labor to check the state of each participant.

Also, in the embodiment of the present invention, when not all the members but the minimum number of members can participate, a message to be notified can be automatically sent only to the members capable of participating, thus automatically making the notice at an appropriate timing.

Further, it is the inventor's intent to retain all equivalents of the claimed invention even if the claims are amended during prosecution.

What is claimed is:

1. A message automatic notification system for sending a message via a communication network to at least another communication terminal device registered in a communication terminal device, the communication terminal device comprising:

registering means for registering a message-sending condition;

obtaining means for obtaining presence information from the other communication terminal device registered in its own communication terminal device via the communication network, the presence information being provided by manual input from an operation unit of the other communication terminal device by a user of the other communication terminal device;

judging means for judging whether the message-sending condition where a message is sent when the presence information turns to be a predetermined on-line state is established based on the obtained presence information; and message sending means for automatically sending a message previously registered by a user in its own communication terminal device when judged that the message sending-condition is established.

2. The message automatic notification system according to claim 1, wherein the obtaining means obtains the presence information from the other communication terminal device registered only for a period previously registered in its own communication terminal device.

3. The message automatic notification system according to claim 1, further comprising message sending-condition storing means for storing the message sending condition, wherein the message sending means sends the message only to a communication terminal device that provides presence information in which the message-sending condition is established, wherein the at least another communication terminal corresponds to N other communication terminals, N being a positive integer greater than or equal to three, wherein the message sending condition corresponds to at least M of the N other communication terminals being on-line at the same time, M being a positive integer greater than or equal to two.

4. The message automatic notification system according to claim 1, wherein the message sending means sends the message by e-mail.

5. The message automatic notification system according to claim 1, wherein the message sending means sends the message by an instant message.

6. The message automatic notification system according to claim 1, wherein the obtaining means obtains the presence information from the registered other communication terminal device through a presence server connected to the communication network.

7. The message automatic notification system according to claim 1, wherein the communication terminal device includes at least one of a mobile phone, a PHS terminal, a PDA, a personal computer, and a game machine.

8. A message automatic notification system for sending a message via a communication network to at least another other communication terminal device registered in a communication terminal device, the communication terminal device comprising:
    a control circuit;
    a communication circuit; and
    a memory unit,
    wherein the control circuit causes a message-sending condition to be registered in the memory unit, obtains presence information from the other communication terminal device registered in the memory unit via the communication circuit from the communication network, judges whether the message-sending condition where a message is sent when the presence information turns to be a predetermined state is established based on the obtained presence information, and automatically sends via the communication circuit a message previously registered by a user in the memory unit when judged that the message-sending condition is established,
    wherein the presence information is provided by manual input from an operation unit of the other communication terminal device by a user of the other communication terminal device.

9. The message automatic notification system according to claim 8, wherein the control circuit obtains the presence information from the other communication terminal device registered in the memory unit only for a period previously registered in the memory unit.

10. The message automatic notification system according to claim 8, further comprising a message sending-condition storing unit that stores the message sending condition, wherein when judged that the message-sending condition is established, the control circuit sends the message via the communication circuit only to a communication terminal device that provides presence information in which the message-sending condition is established, wherein the at least another communication terminal corresponds to N other communication terminals, N being a positive integer greater than or equal to three, wherein the message sending condition corresponds to at least M of the N other communication terminals being on-line at the same time, M being a positive integer greater than or equal to two.

11. The message automatic notification system according to claim 8, wherein when judged that the message-sending condition is established, the control circuit sends the message by e-mail via the communication circuit.

12. The message automatic notification system according to claim 8, wherein when judged that the message-sending condition is established, the control circuit sends the message by an instant message via the communication circuit.

13. The message automatic notification system according to claim 8, wherein the control circuit obtains the presence information from the other communication terminal device registered through a presence server connected to the communication network via the communication circuit.

14. The message automatic notification system according to claim 8, wherein the control circuit includes at least one of a mobile phone, a PHS terminal, a PDA, a personal computer, and a game machine.

15. A message automatic notification method of sending a message via a communication network to at least another communication terminal device registered in a communication terminal device, comprising:
    causing a message-sending condition to be registered in the communication terminal device;
    obtaining presence information from the other communication terminal device registered in the communication terminal device via the communication network, the presence information being provided by manual input from an operation unit of the other communication terminal device by a user of the other communication terminal device;
    judging whether the message-sending condition where a message is sent when the presence information turns to be a predetermined state is established based on the obtained presence information; and
    automatically sending a message previously registered by a user in its own communication terminal device when judged that the message sending-condition is established.

16. The message automatic notification method according to claim 15, wherein when obtaining the presence information, the presence information is obtained from the registered other communication terminal device only for a period previously registered.

17. The message automatic notification method according to claim 15, further comprising storing the message sending condition, wherein when sending the message, the message is sent only to a communication terminal device that provides presence information in which the message-sending condition is established,
    wherein the presence information is provided by manual input from an operation unit of the at least another communication terminal device by a user of the at least another communication terminal device.

18. The message automatic notification method according to claim 15, wherein when sending the message, the message is sent by e-mail.

19. The message automatic notification method according to claim 15, wherein when sending the message, the message is sent by an instant message.

20. A communication terminal device for sending a message via a communication network to at least one of a plurality of other communication terminal devices registered, comprising:
    a sending-condition registering circuit for registering a message-sending condition;
    presence information obtaining means for obtaining presence information via the communication network from the other communication terminal device registered, the presence information being provided by manual input from an operation unit of the other communication terminal device by a user of the other communication terminal device;
    judging means for judging whether the message-sending condition where a message is sent when the presence information turns to be a predetermined state is established based on the obtained presence information; and message sending means for automatically sending a message previously registered by a user in its own communication terminal device when judged that the message-sending condition is established.

21. The communication terminal device according to claim 20, wherein the presence information obtaining means obtains the presence information from the registered other communication terminal device only for a period previously registered.

22. The communication terminal device according to claim 20, further comprising a message sending-condition storing unit that stores the message sending condition, wherein the message sending means sends the message only to a communication terminal device that provides presence information in which the message-sending condition is established, wherein the plurality of other communication terminal devices corresponds to N other communication terminal devices, N being a positive integer greater than or equal to three, wherein the message sending condition corresponds to at least M of the N other communication terminals devices being on-line at the same time, M being a positive integer greater than or equal to two.

23. The communication terminal device according to claim 20, wherein the message sending means sends the message by e-mail.

24. The communication terminal device according to claim 20, wherein the message sending means sends the message by an instant message.

25. A communication terminal device for sending a message via a communication network to at least another communication terminal device registered, the communication terminal device comprising:
a control circuit;
a communication circuit; and
a memory unit,
wherein the control circuit causes a message-sending condition to be registered in the memory unit, obtains presence information from the other communication terminal device registered in the memory unit from the communication network via the communication circuit, judges whether the message-sending condition where a message is sent when the presence information turns to be a predetermined state is established based on the obtained presence information, and automatically sends via the communication circuit a message previously registered by a user in the memory unit when judged that the message-sending condition is established,
wherein the presence information is provided by manual input from an operation unit of the other communication terminal device by a user of the other communication terminal device.

26. The communication terminal device according to claim 25, wherein the control circuit obtains the presence information from the other communication terminal device registered in the memory unit only for a period previously registered in the memory unit.

27. The communication terminal device according to claim 25, further comprising a message sending-condition storing unit that stores the message sending condition, wherein the control circuit sends the message only to a communication terminal device that provides presence information in which the message-sending condition is established when judged that the message-sending condition is established, wherein the at least another communication terminal corresponds to N other communication terminals, N being a positive integer greater than or equal to three, wherein the message sending condition corresponds to at least M of the N other communication terminals being on-line at the same time, M being a positive integer greater than or equal to two.

28. The communication terminal device according to claim 25, wherein the control circuit sends the message by e-mail via the communication circuit when judged that the message-sending condition is established.

29. The communication terminal device according to claim 25, wherein the control circuit sends the message by an instant message via the communication circuit when judged that the message-sending condition is established.

30. The communication terminal device according to claim 25, wherein the control circuit obtains the presence information from the other communication terminal device registered from a presence server connected to the communication network via the communication circuit.

31. A recording medium storing a program which includes a processing for causing a computer of a communication terminal device to send a message via a communication network to at least another communication terminal device registered,
wherein the program includes a processing for causing the computer to cause a message-sending condition to be registered in the computer, to obtain presence information from the other communication terminal device registered in the computer via the communication network, to judge whether the message-sending condition where a message is sent when the presence information turns to be a predetermined state is established based on the presence information obtained, and to automatically send a message previously registered in the computer when judged that the message-sending condition is established, wherein the presence information is provided by manual input from an operation unit of the at least another communication terminal device by a user of the at least another communication terminal device.

32. The recording medium according to claim 31, wherein the program further includes a processing for causing the computer to obtain the presence information from the other communication terminal device registered only for a period previously registered when obtaining the presence information.

33. The recording medium according to claim 31, further comprising a processing for storing the message sending condition, wherein the program further includes a processing for causing the computer to send the message only to a communication terminal device that provides presence information in which the sending-condition is established when sending the message,
wherein the presence information is provided by manual input from an operation unit of the at least another communication terminal device by a user of the at least another communication terminal device.

34. The recording medium according to claim 31, wherein the program further includes a processing for causing the computer to send the message by e-mail when sending the message.

35. The recording medium according to claim 31, wherein the program further includes a processing for causing the computer to send the message by an instant message when sending the message.

* * * * *